United States Patent
Gil et al.

(10) Patent No.: US 11,978,860 B2
(45) Date of Patent: May 7, 2024

(54) LITHIUM-SULFUR (Li—S) BATTERIES AND METHODS OF MANUFACTURING THEREOF

(71) Applicants: Youngjoon Gil, Washington, DC (US); Hancheol Jeong, Washington, DC (US); Sungyong In, Washington, DC (US)

(72) Inventors: Youngjoon Gil, Seoul (KR); Hancheol Jeong, Daejeon (KR); Sungyong In, Germantown, MD (US)

(*) Notice: Subject to any disclaimer, the term of this patent is extended or adjusted under 35 U.S.C. 154(b) by 139 days.

(21) Appl. No.: 17/471,146

(22) Filed: Sep. 9, 2021

(65) Prior Publication Data

US 2022/0077492 A1 Mar. 10, 2022

Related U.S. Application Data

(60) Provisional application No. 63/076,215, filed on Sep. 9, 2020.

(51) Int. Cl.
| | |
|---|---|
| *H01M 10/058* | (2010.01) |
| *H01M 4/04* | (2006.01) |
| *H01M 4/133* | (2010.01) |
| *H01M 4/134* | (2010.01) |
| *H01M 4/1393* | (2010.01) |
| *H01M 4/1395* | (2010.01) |
| *H01M 10/052* | (2010.01) |

(52) U.S. Cl.
CPC ......... *H01M 10/058* (2013.01); *H01M 4/043* (2013.01); *H01M 4/0471* (2013.01); *H01M 4/133* (2013.01); *H01M 4/134* (2013.01); *H01M 4/1393* (2013.01); *H01M 4/1395* (2013.01); *H01M 10/052* (2013.01); *H01M 2300/0025* (2013.01)

(58) Field of Classification Search
CPC .. H01M 10/058; H01M 4/043; H01M 4/0471; H01M 4/133; H01M 4/134; H01M 4/1393; H01M 4/1395; H01M 10/052; H01M 2300/0025
See application file for complete search history.

(56) References Cited

U.S. PATENT DOCUMENTS

2018/0351159 A1* 12/2018 Fujiki ................... H01M 4/661
2019/0372155 A1* 12/2019 Yersak .................. H01M 50/46

* cited by examiner

*Primary Examiner* — Stewart A Fraser
(74) *Attorney, Agent, or Firm* — Ichthus International Law PLLC (57) ABSTRACT

A Li-metal or metal alloy based batteries with a multilayer structure and the method of manufacturing the same are provided herein. The method includes a preparation step, a stacking step, a pressing step, a cutting step and a termination plating step. Further, a sintering step may be performed prior to the termination plating step. The multilayer structure includes multiple unit battery structures and each battery structure is configured to include an anode layer including a Li-metal or metal allow with a two-dimensional (2D) material coated on the Li-metal or Li-metal alloy, a cathode layer including carbon-sulfur composites and solid or polymer electrolytes between the anode layer and the cathode layer. The 2D material include MoS2 and the carbon-sulfur composites include carbon nanotubes, sulfur, carbon wires, carbon powder, or $Li_2S$ powder.

9 Claims, 8 Drawing Sheets

LITHIUM-SULFUR (Li—S) BATTERIES AND METHODS OF MANUFACTURING THEREOF

CROSS-REFERENCE AND RELATED APPLICATION(S)

This application claims priority to U.S. Provisional Application No. 63/076,215 filed Sep. 9, 2020, titled "METHOD AND MANUFACTURE OF ADVANCED LITHIUM SULFUR (Li—S) BATTERIES," the content of which is incorporated herein by reference in its entirety.

TECHNICAL FIELD

The present disclosure relates to design and manufacture of advanced batteries and, in particular, to lithium-Sulfur (Li—S) batteries having a multilayered structure and methods of manufacturing thereof.

BACKGROUND

Development of advanced battery technology beyond Li-ion batteries is well under way by numerous groups throughout the world. This is because the current Li-ion battery technology has limitations such as limited energy capacity in view of current demands, as well as safety concerns in Li-ion batteries. Because of safety concerns due to certain explosive events which is mainly caused by the use of liquid electrolytes and dendrite growth on the Li anode in the Li-ion batteries, advanced battery technologies including solid or polymer electrolytes are being actively studied by various research groups. As an alternative to the Li-ion technology, Li—S technology has been considered as a promising technology. However, the technology is still under development and a process of manufacturing Li—S battery cells may involve a very costly process because Li is very volatile in air and highly reactive and flammable. As such, compared to the traditional technology such as Li-ion technology, a scale-up process for the advanced battery technology such as Li—S technology is not available and still under active development efforts.

Thus, there is still a need for development of a cheaper, easier, and scalable manufacturing process or technique for advanced battery cells such as Li-metal based cells, in particular, for solid state Li—S battery cells. The present disclosure attempts to fulfill such a need or void by disclosing and providing novel manufacturing processes or techniques and component configurations of Li—S battery cells used in the novel manufacturing processes or techniques.

SUMMARY

In an aspect of the present disclosure, a method of manufacturing a lithium sulfur (Li—S) battery having a multilayer structure is provided herein. First, a plurality of sheets of anode layer comprising Li-metal or Li-metal alloy layer and a two-dimensional (2D) material, a plurality of sheets of cathode layer comprising sulfur (S) and carbon material, and a plurality of sheets of electrolyte layer comprising a polymer electrolyte or a polymer electrolyte including conductive nanowires are provided. The multilayer structure may include a first unit battery structure and a second unit battery structure, wherein the second unit battery structure is disposed on top of the first unit battery structure. Pressure is applied to the multilayered structure that are stacked so that tight contact between the layers is obtained and ionic conductivity of the electrolyte layer is increased. The pressed multilayered structure including the first unit battery structure and the second unit battery structure is then cut into a plurality of multilayered battery cells. Terminal connections are made to the multilayered battery cells through termination and plating, and thereby the Li—S battery with a multilayer structure is obtained.

In an aspect of the present disclosure, the method of manufacturing the Li—S battery having the multilayer structure may further include a step of sintering prior to the termination plating step, which is a step of baking the plurality of multilayered battery cells at a predetermined temperature to increase crystalline structures of the electrolytes and burn binders used in the construction of the multilayered battery cells.

In another aspect of the present disclosure, the method of manufacturing the Li—S battery having the multilayer structure may further include a step of testing and inspecting for basic operation of the Li—S battery having the multilayer structure.

In an aspect of the present disclosure, in the method of manufacturing the Li—S battery having the multilayer structure, at least one sheet of anode layer, cathode layer, or electrolyte layer includes a corrugated surface with a predetermined pattern for making tight contact during the staking step.

In an aspect of the present disclosure, in the method of manufacturing the Li—S battery having the multilayer structure, the pressure applied in the staking step may be greater than 300 MPa.

In an aspect of the present disclosure, in the method of manufacturing the Li—S battery having the multilayer structure, the 2D material of anode layer may comprise $MoS_2$, $MoTe_2$, $MoSe_2$, $WS_2$, $WSe_2$, $TiS_2$, $TaSe_2$, $NbSe_2$, $NiTe_2$, BN, BN—C, or alloys thereof.

In an aspect of the present disclosure, in the method of manufacturing the Li—S battery having the multilayer structure, the carbon material of cathode layer may comprise carbon nanofibers, carbon nanotubes (CNTs), carbon powder or a combination thereof.

In an aspect of the present disclosure, in the method of manufacturing the Li—S battery having the multilayer structure, the electrolyte layer may comprise a polymer electrolyte layer including conductive nanowires.

In an aspect of the present disclosure, in the method of manufacturing the Li—S battery having the multilayer structure, the cathode layer comprises a solid or polymer electrolyte including the carbon material and $Li_2SX$ particles, where X=P, Si, Ge, AL, or B.

In another aspect of the present disclosure, a lithium sulfur (Li—S) battery having a multilayer structure is provided. The Li—S battery includes a positive terminal, a negative terminal, and a multilayered structure including a plurality of unit battery structures. Each unit battery structure includes a cathode layer, an anode layer, and an electrolyte layer disposed between the cathode layer and the anode layer, and the unit battery structures are stacked on top of each other. The cathode layer of each unit battery structure is coupled to the positive terminal and the anode layer of each unit battery structure is coupled to the negative terminal. Also, the anode layer includes a Li-metal or Li-metal alloy layer having a first surface and a second surface, and a coating layer of two-dimensional (2D) material on the first surface of the Li-metal or Li-metal alloy layer. The cathode layer includes sulfur and carbon material.

In another aspect of the present disclosure, the 2D material of anode layer of the Li—S battery may include $MoS_2$, $MoTe_2$, $MoSe_2$, $WS_2$, $WSe_2$, $TiS_2$, $TaSe_2$, $NbSe_2$, $NiTe_2$, BN, BN—C, or alloys thereof.

In still another aspect of the present disclosure, the carbon material of cathode layer of the Li—S battery may include carbon nanofibers, carbon nanotubes (CNTs), carbon powder or a combination thereof.

In still another aspect of the present disclosure, the electrolyte of the Li—S battery includes a polymer electrolyte layer including conductive nanowires.

Yet in still another aspect of the present disclosure, the Li—S battery may include a first insulation layer disposed between the anode layer of a first unit battery structure of the plurality of unit battery structures and the cathode layer of a second unit battery structure of the plurality of unit battery structures. Further, the second unit battery structure is disposed on top of the first unit battery structure, and the first insulation layer is configured to prevent electronic or ionic flow between the first unit battery structure and the second unit battery structure. Also, the coating layer of the 2D material of the anode layer of the first unit battery structure is disposed facing the electrolyte layer of the first unit battery structure.

In another aspect of the present disclosure, the anode layer of the Li—S battery may include a Li-metal or Li-metal alloy layer having a first surface and a second surface, and the coating layer of 2D material is disposed on both the first surface and the second surface of the Li-metal or Li-metal alloy layer.

In another aspect of the present disclosure, the cathode layer of the Li—S battery may include a solid or polymer electrolyte including the carbon material and $Li_2SX$ particles, where X=P, Si, Ge, AL, or B.

BRIEF DESCRIPTION OF THE DRAWINGS

These and other features, aspects and advantages of the present disclosure will become better understood from the following description, appended claims, and accompanying figures where:

DETAILED DESCRIPTION OF EMBODIMENT(S)

The detailed description of illustrative examples will now be set forth below in connection with the various drawings. The description below is intended to be exemplary and in no way limit the scope of the present technology. It provides a detailed example of possible implementation and is not intended to represent the only configuration in which the concepts described herein may be practiced. As such, the detailed description includes specific details for the purpose of providing a thorough understanding of various concepts, and it is noted that these concepts may be practiced without these specific details. In some instances, well known structures and components are shown in block diagram form in order to avoid obscuring such concepts. It is noted that like reference numerals are used in the drawings to denote like elements and features.

Further, methods and devices that implement example embodiments of various features of the present technology are described herein. Reference in the description herein to "one embodiment" or "an embodiment" is intended to indicate that a particular feature, structure, or characteristic described in connection with the example embodiments is included in at least an embodiment of the present technology or disclosure. The phrases "in one embodiment" or "an embodiment" or "an example embodiment" in various places in the description herein are not necessarily all referring to the same embodiment.

In the following description, specific details are given to provide a thorough understanding of the example embodiments. However, it will be understood by one of ordinary skill in the art that the example embodiments may be practiced without these specific details. Well-known circuits, structures and techniques may not be shown in detail in order not to obscure the example embodiments (e.g., interconnects, etc.). Also, in the present description, the terms "anode layer" includes a meaning of "another electrode" and may be interchangeably used with "anode electrode"; "cathode layer" include a meaning of "cathode electrode" and may be interchangeably used with "cathode electrode"; "electrolyte layer" include a meaning of "electrolyte" and may be interchangeably used with "electrolyte" as in general battery terminology. Further, in the description, the term "terminal" is defined to include a common terminal. As such, "a positive terminal" means a common positive (+) terminal and "a negative terminal" means a common negative (−) terminal. Also, the term "2D material(s)" is used to refer to a single layer material consisting of a single layer of atom. Molybdenum disulfide ($MoS_2$) is just one of the 2D materials and the present disclosure is not limited thereto. $MoS_2$ is an inorganic compound comprised of molybdenum and sulfur, which is classified as a transition metal dichalcogenide, having similar appearance to graphite.

Further, although the example embodiments herein describe various aspects of the present technology in reference to the manufacture and design of Li—S batteries, application of the present technology may not be limited thereto and may be applied to other Li-metal or metal alloy based batteries. By way of example, the present technology may be applied to manufacturing of solid state Li-ion batteries, as well as to manufacturing of solid state Li—S batteries.

Figure 1:
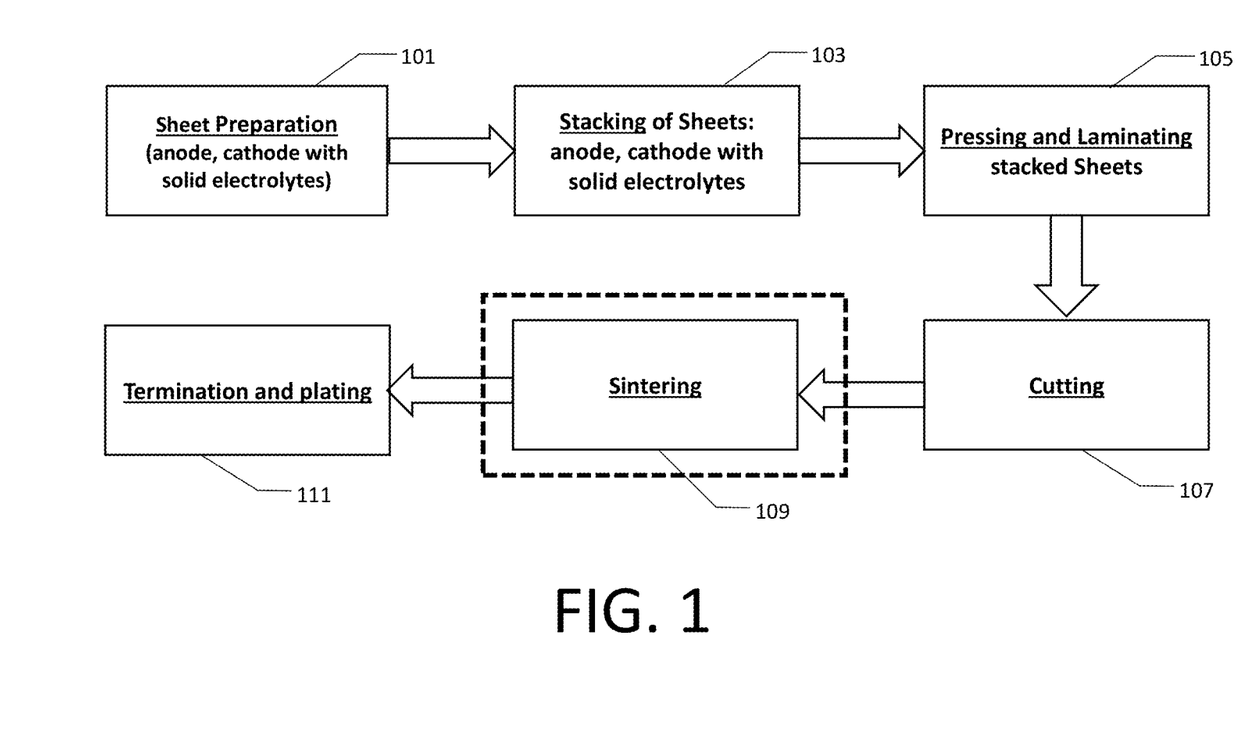
FIG. 1 is a diagram conceptually illustrating an embodiment of the present disclosure.

In an aspect of the present disclosure, a method of manufacturing Li-metal or metal alloy based batteries having a multilayer structure is illustrated using a block diagram as shown in FIG. 1. For illustration purpose, FIG. 1 provides a novel manufacturing process for solid state Li—S battery cells or components thereof. By way of example, Li—S batteries with a multilayer structure may be manufactured following the steps: sheet preparation 101, stacking 103, pressing and laminating 105, cutting 107, optionally sintering 109, and termination and plating 111. More specifically, during the preparation step 101, one or more sheets of anode layer, one or more sheets of cathode layer, and one or more sheets of electrolyte layer are prepared and provided. Also, one or more sheets of insulation layer are provided for different embodiments of the present disclosure.

For the sheets of anode layer, a sheet of a lithium (Li) metal or metal alloy may be used as a base component. In an aspect of the present disclosure, the sheet of anode layer may include one or more additional layers of two-dimensional (2D) or three-dimensional (3D) material as one or more coating layers on the Li-metal or Li-metal alloy. By way of example, the 2D material of the coating layer may include $MoS_2$, $MoTe_2$, $MoSe_2$, $WS_2$, $WSe_2$, $TiS_2$, $TaSe_2$, $NbSe_2$, $NiTe_2$, BN, BN—C, or alloys thereof. Further, in broad terms, the 2D material may include 2D transitional metal dichalcogenide materials, such as $MX_2$, where M=transition metal including Ti, V, Co, Ni, Zr, Nb, Mo, Tc, Rh, Pd, Hf, Ta, W, Re, Ir, and Pt and X=S, Se, and Te. In one example, $MX_2$ may be such that M=Cr, Mo, or W and X=S, Se, Te and the bandgap is limited to 0.9-2.1 eV. In the example discussed herein, $MoS_2$ is selected as the 2D material, but other 2D material and their combinations may also be selected for different applications and uses. Also, the 2D material may be disposed as a coating layer on the sheet of Li-metal or Li-metal alloy, via sputtering (e.g., roll-to-roll sputtering), chemical vapor deposition (CVD) techniques or the like.

For the sheets of cathode layer, carbon material such as carbon nanofibers, carbon nanotubes (CNTs), carbon powers or a combination thereof may be mixed or processed with sulfur to obtain one or more sheets of cathode layer. Further, in an aspect of the present disclosure, the cathode layer may include a mixture of sulfur, graphite, carbon, CNTs, graphene, or carbon fibers. In one implementation, the CNTs may be mixed with sulfur particles to obtain free standing 3D CNTs with sulfur as the cathode layer. In one implementation, the cathode layer may include electrode in the form of a mixture including sulfur and graphite, carbon, carbon nanotubes, graphene, or carbon fibers or the like. Further, the carbon nanotubes may be mixed with sulfur particles to result free standing 3D carbon nanotubes with sulfur. Furthermore, in another implementation, the cathode layer may include sulfur-carbon composites. By way of example, sulfur-carbon composites may include carbon nanotubes with sulfur composites including free standing three dimensional (3D) carbon nanotube (CNT) meshes which contain sulfur particles. Further, the sulfur-carbon composites may include CNTs, sulfur, carbon wires, carbon powder, or $Li_2S$ powder. In an aspect of the present disclosure, the sulfur-carbon composites may be formed by mixing and grinding a mixture of CNTs, sulfur, and $Li_2S$ powder. In one implementation, the sulfur-carbon composites may include CNT-carbon fiber veil composites.

For the sheets of electrolyte layer, a solid or polymer electrolyte may be used. In one example, one or more sheets of a lithium sulfide based solid electrolyte such as $Li_9P_3S_{12}$ (LPS), $Li_{10}GeP_2S_{12}$ (LGPS), Argyrodite type $Li_6PS_5Cl$, or the like may be used. It is noted that in preparing LPS, LGPS, and $Li_6PS_5X$ (X=Cl, Br, I), or the like, $Li_2S$ powder may be used for synthesizing sheets of sulfide based solid electrolyte layer. It is noted that generally the sulfide based solid electrolyte may be in the form of LaMbPcSdXe, where L=alkali metal, M=B, AL, Ga, In, Si, Ge, Sn, Pb, As, Sb, Bi, Ti, V, Cr, Mn, Fe, Co, Ni, Cu, Y, Zr, Nb, Mo, Tc, Ru, Rh, Pd, Ag, Hf, Ta, or W, and X=F, Cl, Br, I or O, and $0 \leq a \leq 12$, $0 \leq b \leq 6$, $0 \leq c \leq 6$, $0 \leq d \leq 12$, $0 \leq e \leq 9$. Further, in case of sulfide based solid electrolytes, for example, $Li_2SX$, where X=P, Si, Ge, AI or B, certain additives may be added to the solid electrolytes in order to increase Li-ion conductivity of the solid electrolytes. By way of example, the addition of additives such as P, Si, GE, AI, or B to $Li_2S$ may result in a higher level of Li-ion conductivity, thereby forming a basis for making the solid electrolytes. Also, in one implementation, $Li_2S$ powder may be used to synthesize sulfide based solid electrolytes.

Further, in another aspect of the present disclosure, one or more sheets of a lithium oxide based solid electrolyte such as lithium phosphorous oxynitride (LiPON) may be prepared and used. LiPON is a commonly used solid electrolyte in thin film batteries. Also, other oxide based solid electrolyte may include garnets, LISICON, and LTAP. More specifically, the oxide based solid electrolyte may include LiPON, $Li_3PO_4$, $Li_2SiO_2$, $Li_2SiO_4$, $Li_{0.5}La_{0.5}TiO_3$, $Li_{1.3}Al_{1.3}Ti_{0.77}[PO_4]_3$, $La_{0.51}Li_{0.34}TiO_{0.74}$, and $Li_{1.5}Al_{0.5}Ge_{1.5}[PO_4]_3$, any combination thereof, and the like.

Alternatively, in another aspect of the present disclosure, one or more sheets of polymer electrolyte or polymer electrolyte including conductive nanowires (e.g., $Mg_2B_2O_5$) may be prepared and used. The polymer electrolytes are known as softer solid electrolytes designed to accommodate the strain from battery operation such as charge and discharge cycles. As such, the polymer electrolytes are better suited to tolerate morphological change in the electrode surfaces (e.g., anode layer and cathode layer) and maintain good interfacial contact during the battery operation.

Further, in another aspect of the present disclosure, a binder may be used in the anode layer, the cathode layer, and/or the electrolyte layer, to increase its adhesive strength. By way of example, the binder may include butadiene rubber, isoprene rubber, styrene-butadience rubber (SBR), styrene-butadiene-styrene (SBS), styrene-ethylene-butadiene-styrene (SEBS), ethylene-propylene, butyl rubber, chloroprene rubber, acrylonitrile-butadiene rubber, crylic rubber, silicone rubber, fluororubber, or urethane rubber, polyvinylidene fluoride (PVDF), polyvinylidene fluoride-hexafluoropylene copolymer (PVDF-HFP), polyimide, polyamide, polyamide imide, polyvinyl alcohol, chlorinated polyethylene (CM) and the like.

Figure 2A:
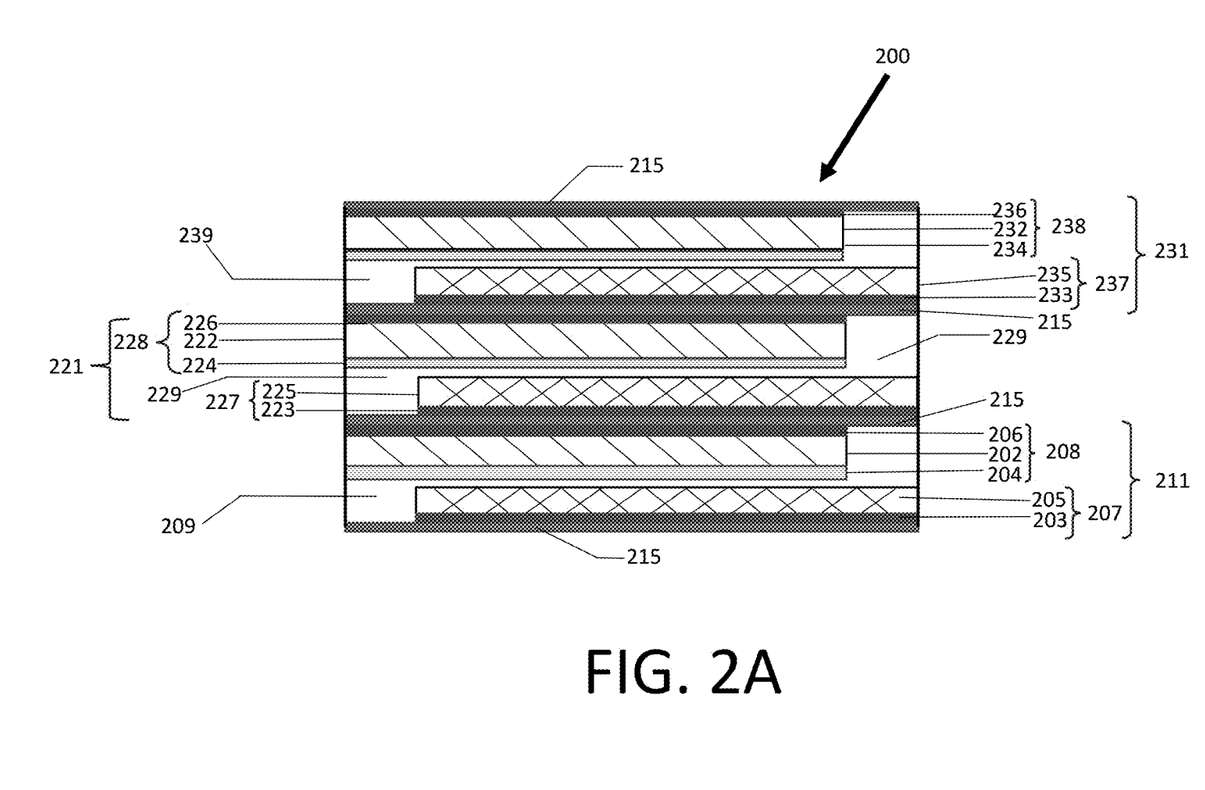
FIGS. 2A and 2B are diagrams illustrating cross-sectional views of an example embodiment of the present disclosure.

Referring back to FIG. 1, at stacking step 103, the one or more prepared sheets of cathode layer, anode layer, and electrolytes are stacked together to form a multilayer structure as shown in FIG. 2A. By way of example, a sheet of solid electrolyte, e.g., LGPS, LPS or Argyrodite type $Li_6PS_5Cl$, may be disposed on top of a sheet of anode layer comprising Li-metal or Li-metal alloy with a 2D material coating such as $MoS_2$. Then, a sheet of cathode layer comprising carbon material such as carbon fibers, carbon nanotubes (CNTs), carbon powder or the like with sulfur may be placed on top of the sheet of solid electrolyte, thereby forming a first unit battery structure of the multilayer structure. Further, in an aspect of the present disclosure, optionally and a sheet of insulation material may be disposed on top of the first unit battery structure and a second battery structure may be laid on the first unit battery structure to form the multilayer structure as shown in FIG. 2A. That is, multiple layers of sheets may be constructed or stacked in such a way that multiple unit battery structures may be laid in alternating arrangement on top of each other to result in a multilayer structure of a Li—S battery, in accordance with an aspect of the present disclosure.

After the multiple stacks of the unit battery structures are formed in the Stacking Step 103, at Pressing and Laminating Step 105, the multiple stacks of the unit battery structures are pressed or cold pressed and laminated for tighter contact between the multiple stacks or layers within each battery structure. In one example, applying pressure of grater than 360 MPa may densify the solid electrolytes (e.g., $75Li_2S_{25}P_2S_5$) and increase the level of ionic conductivity of the electrolytes. It is noted that the amount of pressure applied to the multiple stacks of the unit battery structures depends upon the composition of the electrolytes.

In an aspect of the present disclosure, during Pressing and Lamination Step 105, tighter contact between layers may be obtained through corrugation, embossing, or nanoimprinting techniques applied on one or more layers of the multiple stacks. By way of example, sheets of anode layer, cathode layer, electrolyte layer or insulation layer may be impressed to have rough surface characteristics, e.g., corrugation. That is, surfaces of cathode layer, anode layer, electrolyte layer, or insulation layer may be corrugated, via embossing, synchrotron radiation, or nanoimprint processes, with a repeating pattern or a random pattern having a certain height to form tighter contact with other layers.

Referring back to FIG. 1, after the Pressing and Laminating Step 105, the pressed multilayer structures or stacks are cut into a plurality of multilayered battery cells having a predetermined shape and size. FIG. 2A shows an example of a cross section of a multilayered battery cell obtained from the Pressing and Lamination Step 105. In the example, the multilayered battery cell 200 includes a first unit battery structure 211, a second unit battery structure 221, and a third unit battery structure 231, as well as insulation layers 215 separation each unit battery structures in the example of FIG. 2A. In an aspect of the present disclosure, the first unit battery structure 211 includes a cathode layer 205 disposed on a cathode collector 203, an anode layer 208 including a Li-metal or metal alloy layer 202, a 2D coating layer 204 (e.g., $MoS_2$) and an anode collector layer 206, and an electrolyte layer 209. The second unit battery structure 221 includes a cathode layer 225 disposed on a cathode collector 223, an anode layer 228 including a Li-metal or metal alloy layer 222, a 2D coating layer 224 (e.g., $MoS_2$) and an anode collector layer 226, and an electrolyte layer 229. The third unit battery structure 231 includes a cathode layer 235 disposed on a cathode collector 233, an anode layer 238 including a Li-metal or metal alloy layer 232, a 2D coating layer 234 (e.g., $MoS_2$) and an anode collector layer 236, and an electrolyte layer 239. It is also noted that in some electrolytes such as electrolytes of sulfide glasses, glass-ceramics, or crystalline materials, the sintering may decrease porosity and help to reduce the effect of grain boundary resistance and mitigate the growth of lithium dendrites. Further, the anode collector layer may include a metal material such as gold, zinc, copper, nickel, titanium, tin, platinum, or an alloy of two or more thereof, a carbon material, or a conductive resin material. The thickness of the anode collector layer may be in the range of 5 um and 30 um or may be determined based on the composition of the solid electrolytes.

In an aspect of the present disclosure, optionally at Sintering Step 109, the plurality of multilayered battery cells may be baked or sintered at a predetermined temperature to tighten crystalline structures of solid electrolytes and/or burn our binders used in the plurality of multilayered battery cells. In one implementation, sintering may be followed by cleaning and metallization of both end surfaces of multilayered battery cells as shown in FIG. 2A.

Figure 2B:
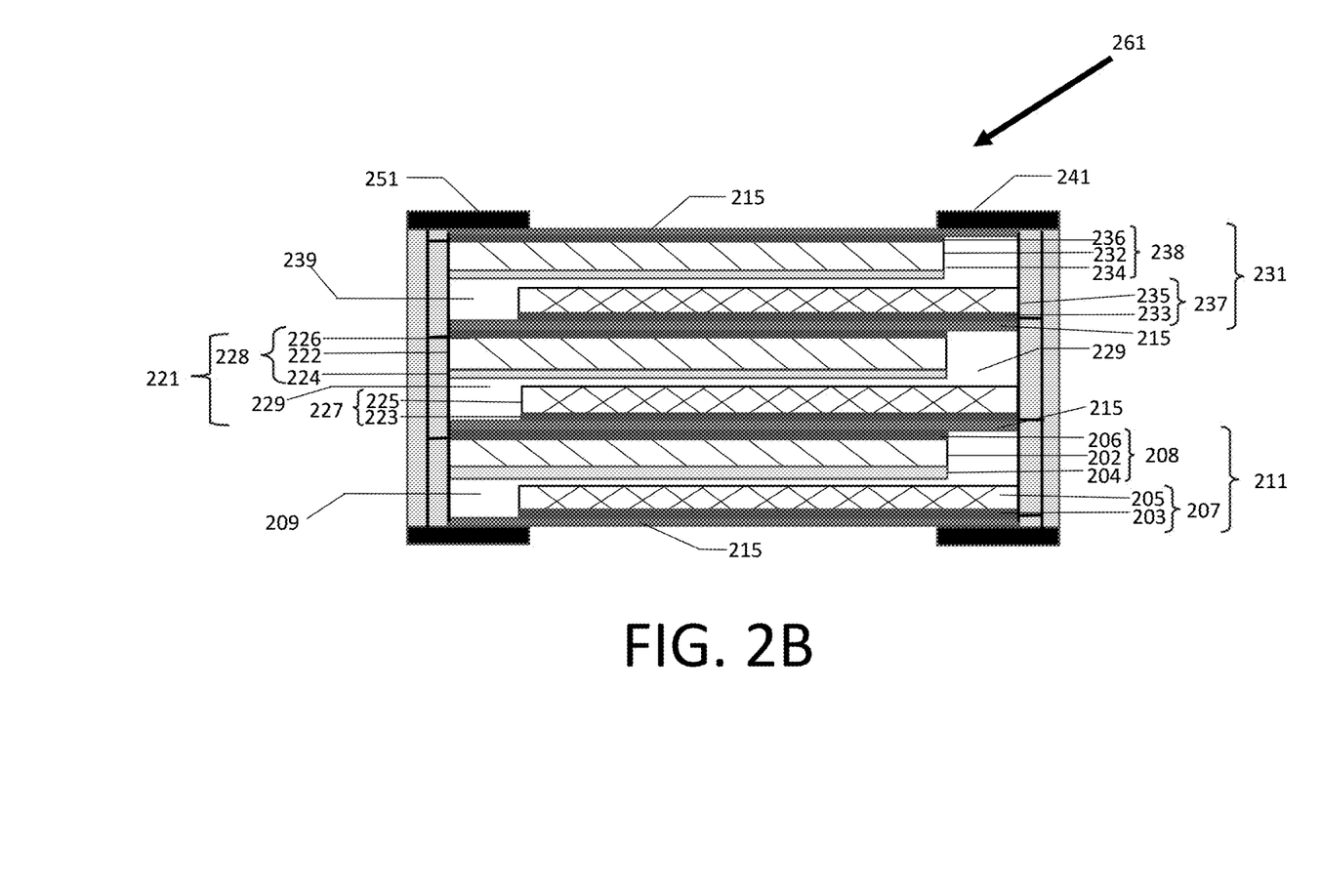

In another aspect of the present disclosure, at Termination and Plating Step 111, the ends of the inner electrodes, e.g., cathode layers and anode layers, may be connected in parallel and the multilayered battery cells get terminals, e.g., positive terminal 241 and negative terminal 251, resulting in a Li—S battery with a multilayer structure 261 as shown in FIG. 2B. After the termination and plating, the Li—S batteries with the multilayer structure 261 are tested and inspected for basic operation of the batteries, such as charge and discharge operations. Also, it is noted that depending on a desired level of battery capacity and/or voltage, the number of unit battery structures may be determined.

Figure 3A:
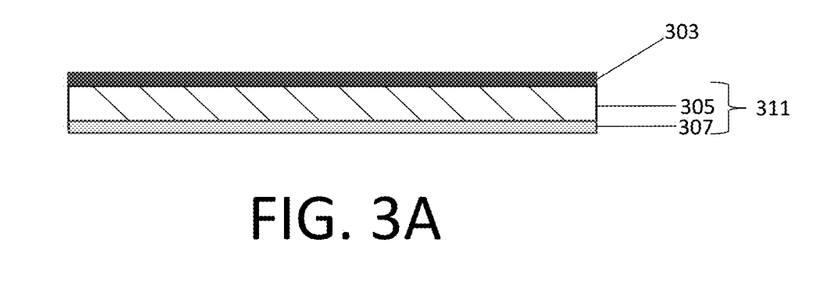
FIGS. 3A and 3B are diagrams conceptually illustrating example embodiments in an aspect of the present disclosure.
Figure 3B:
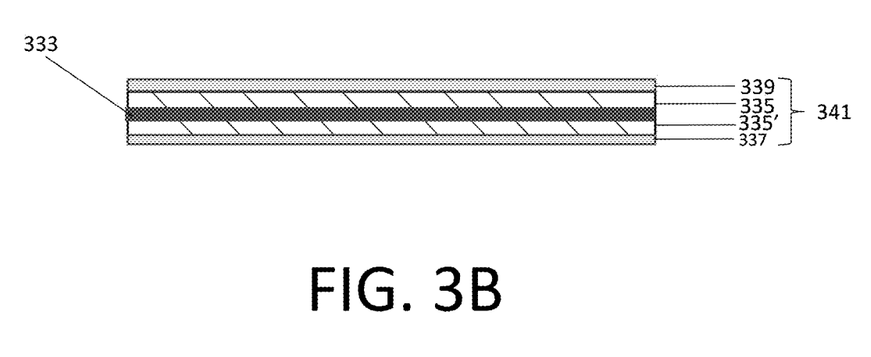

In another aspect of the present disclosure, FIGS. 3A and 3B illustrate different configurations of an anode layer and an anode collector which may be possible in accordance with one or more aspects of the present disclosure. As shown in FIG. 3A, an anode layer 311 may include a Li-metal or metal alloy layer 305 and a coating of a 2D material 307 on one surface of the Li-metal or metal alloy layer 305. As shown above, the anode layer 311 may include a collector layer 303 disposed on the other surface of the Li-metal or metal alloy layer 307. In an aspect of the present disclosure, as shown in FIG. 3B, an anode layer 341 may include a collector layer 333 disposed between two Li-metal or metal alloy layers 335 and 335' and further include a first coating of a 2D material 337 disposed on a surface of the Li-metal or metal alloy layer 335' and a second coating of a 2D material 339 disposed on a surface of the Li-metal or metal alloy layer 335. In another aspect of the present disclosure, use of the anode layer 341 as shown in FIG. 3B may provide another embodiment of the present disclosure as shown in FIG. 4.

Figure 4:
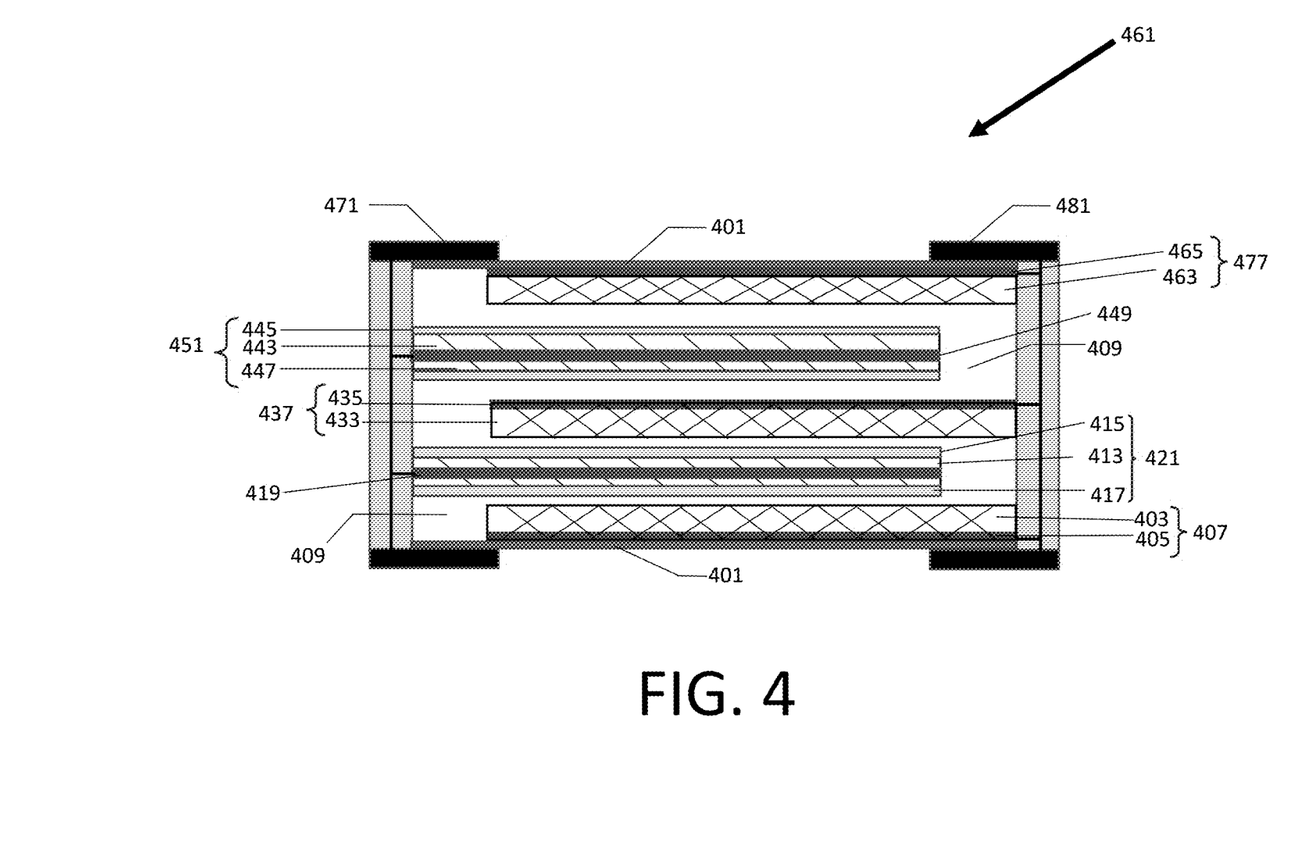
FIG. 4 is a diagram illustrating a cross-sectional view of an example embodiment in an aspect of the present disclosure.

FIG. 4 illustrates another example embodiment 461 of a Li—S battery with a multilayer structure in accordance with an aspect of the present disclosure. The Li—S battery 461 with a multilayer structure includes multiple insulation layers 401, a first cathode layer 403 with a collector layer 405, a first anode layer 421 including a Li-metal or metal alloy layer 413, a collector layer 419 and 2D coating layers 415, 417, a second cathode layer 437 including a Li-metal or metal alloy layer 433 with a collector layer 435, a third anode layer 451 including a Li-metal or metal alloy layer 443, a collector layer 449 and 2D coating layers 445,447, a fourth cathode layer 477 including a Li-metal or metal alloy layer 463 with a collector layer 465. Further, the Li—S battery 461 includes a positive terminal 481 and a negative terminal 471.

Figure 5:
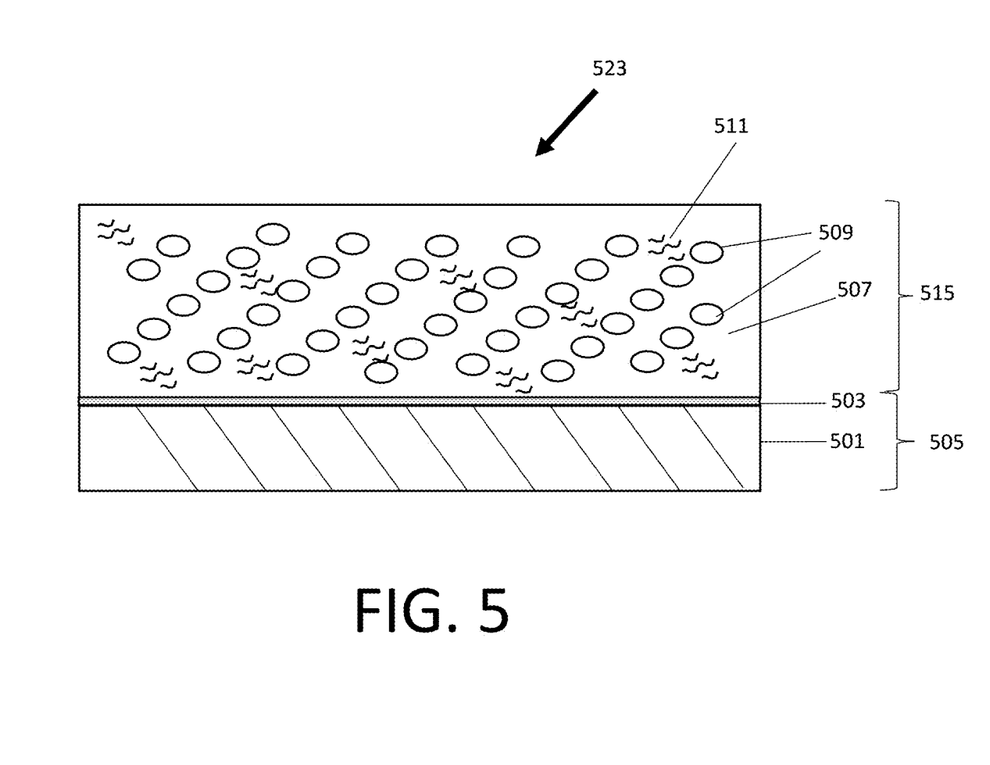
FIG. 5 is a diagram conceptually illustrating an example embodiment in an aspect of the present disclosure.

FIG. 5 illustrates another example embodiment in accordance with an aspect of the present disclosure. The example embodiment of FIG. 5 includes an anode layer 505 comprising a Li-metal or metal alloy layer 501 and a 2D material coating 503 disposed on the Li-metal or metal alloy layer 501, and a cathode solid electrolyte 515. In an aspect of the present disclosure, the cathode solid electrolyte 515 includes a mixture of solid electrolytes 507, sulfur 509, and conductive nanowires 511. In another aspect of the present disclosure, the conductive nanowires 511 may include carbon, carbon nanotubes, carbon fibers, graphene, graphite, or the like. In another aspect of the present disclosure, the cathode solid electrolyte 515 may include a mixture of carbon nanotubes with sulfur and $Li_2S$ powder. Further, in another aspect of the present disclosure, to increase the ionic conductivity, certain additives may be added the solid electrolyte; that is, $Li_2SX$, where X=P, Si, Ge, Al or B is used.

Figure 6A:
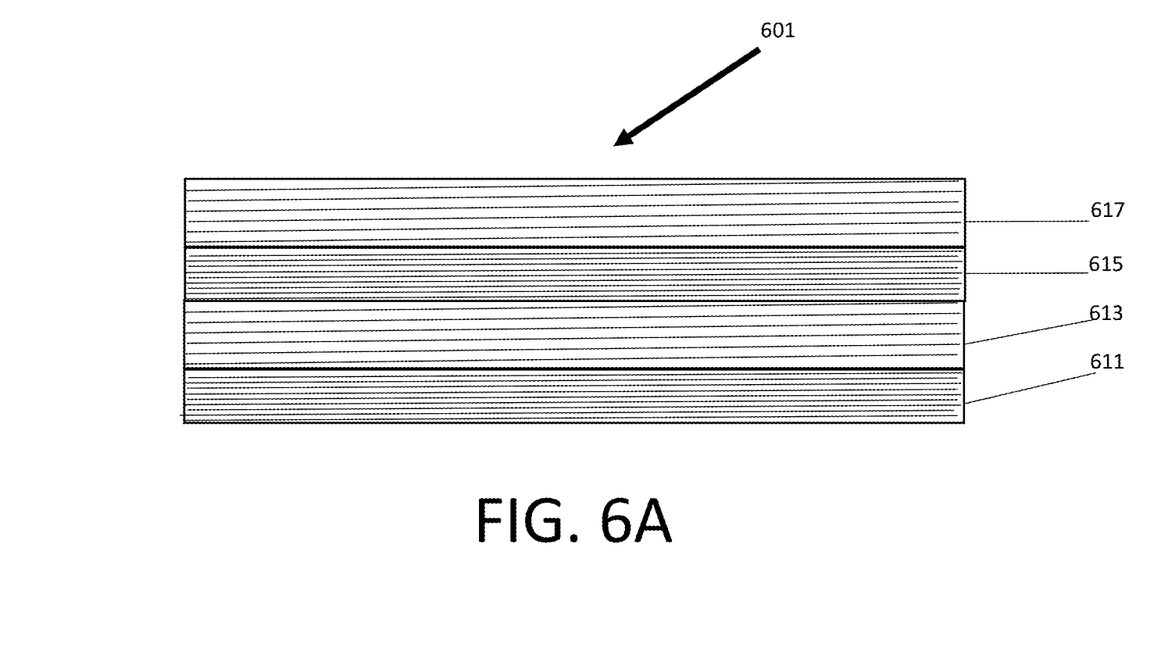
FIGS. 6A and 6B are diagrams conceptually illustrating example embodiments in an aspect of the present disclosure.
Figure 6B:
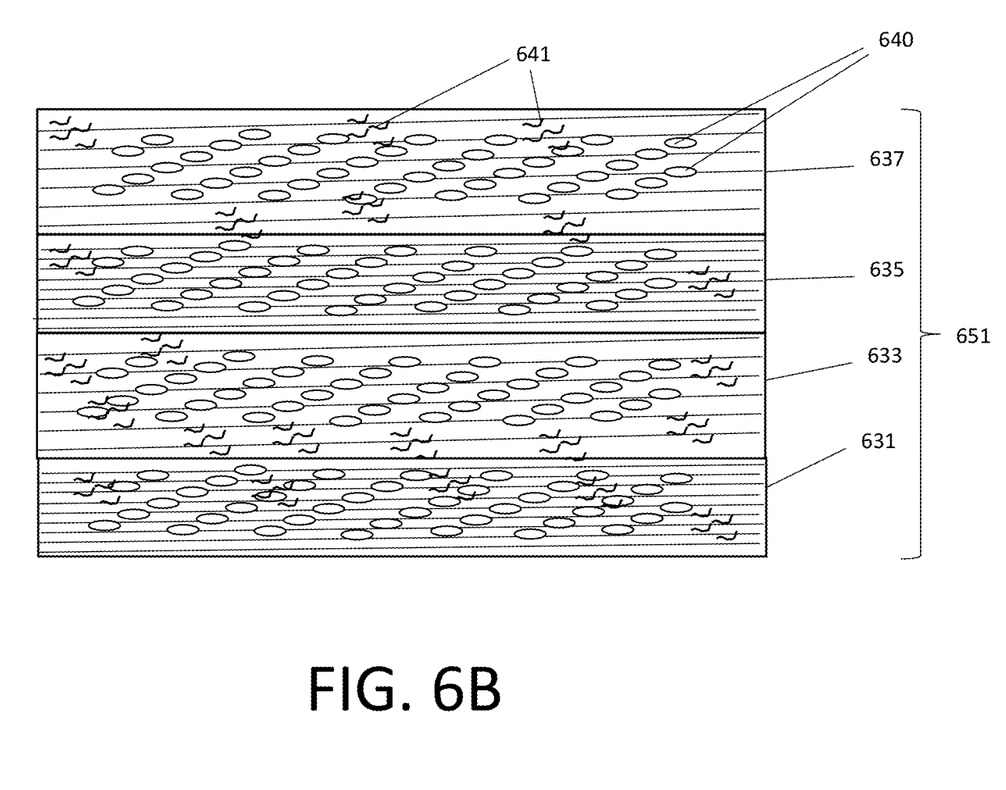

FIGS. 6A and 6B illustrate example embodiments of the present disclosure in accordance with aspects of the present disclosure. In another aspect of the present disclosure, an electrolyte layer shown in FIG. 2A, FIG. 2B, and FIG. 4 may include multiple solid electrolytes stacked in gradation of voltages to facilitate ionic transport between the anode layer and the cathode layer. The gradation of voltages over different regions 611, 613, 615, 617 as shown in FIG. 6A facilitate the ionic transport in the solid electrolyte 601 by shortening the gaps therebetween. In another aspect of the present disclosure, as shown in FIG. 6B, an electrolyte layer 651 may include $Li_2S$ particles 640, as well as conductive nanowires 641 over multiple graduation of voltages areas 631,633,635,637. In the example, the conductive nanowires 641 are embedded in the electrolyte layer 651 to increase the ionic conductivity of the electrolyte 651. Alternatively, the conductive nanowires 641 may be deposited on different sheets of the electrolyte having different gradation of voltages.

As such, the present disclosure provides novel Li—S battery cell configurations as well as their novel manufacturing techniques thereof.

As shown above, various methods, techniques, arrangements or their variants may be implemented for manufacturing Li-metal based batteries and their novel configurations. Other embodiments of the present technology may also be possible and are not limited to the disclosed embodiments herein.

In the present disclosure, a singular form may include a plural form if there is no clearly opposite meaning in the context. Also, as used herein, the article "a" is intended to include one or more items. Further, no element, act, step, or instruction used in the present disclosure should be construed as critical or essential to the present disclosure unless explicitly described as such in the present disclosure. As used herein, except explicitly noted otherwise, the term "comprise" and variations of the term, such as "comprising," "comprises," and "comprised" are not intended to exclude other additives, components, integers or steps. The terms "first," "second," and so forth used herein may be used to describe various components, but the components are not limited by the above terms. The above terms are used only to discriminate one component from other components, without departing from the scope of the present disclosure. Also, the term "and/or" as used herein includes a combination of a plurality of associated items or any item of the plurality of associated items. Further, it is noted that when it is described that an element is "coupled" or "connected" to another element, the element may be directly coupled or directly connected to the other element, or the element may be coupled or connected to the other element through a third element. Also, the term "include" or "have" as used herein indicates that a feature, an operation, a component, a step, a number, a part or any combination thereof described herein is present. Further, the term "include" or "have" does not exclude a possibility of presence or addition of one or more other features, operations, components, steps, numbers, parts or combinations. Furthermore, the article "a" as used herein is intended to include one or more items. Moreover, no element, act, step, or instructions used in the present disclosure should be construed as critical or essential to the present disclosure unless explicitly described as such in the present disclosure.

Although the present technology has been illustrated with specific examples described herein for purposes of describing example embodiments, it is appreciated by one skilled in the relevant art that a wide variety of alternate and/or equivalent implementations may be substituted for the specific examples shown and described without departing from the scope of the present disclosure. As such, the present disclosure is intended to cover any adaptations or variations of the examples and/or embodiments shown and described herein, without departing from the spirit and the technical scope of the present disclosure.

What is claimed is:

1. A method of manufacturing a lithium sulfur (Li—S) battery having a multilayer structure, comprising steps of:
   (a) a preparation step of providing one or more sheets of anode layer, cathode layer, and electrolyte layer;
   (b) a stacking step of:
      forming a multilayered structure having a first unit battery structure and a second unit battery structure, by placing sheets of the second unit battery structure on top of sheets of the first unit battery structure,
      wherein the first unit battery structure comprises: a first sheet of cathode layer, a first sheet of electrolyte layer disposed on top of the first sheet of cathode layer, and a first sheet of anode layer disposed on top of the first sheet of electrolyte layer,
      wherein the second unit battery structure comprises: a second sheet of cathode layer, a second sheet of electrolyte layer disposed on top of the second sheet of cathode layer, and a second sheet of anode layer disposed on top of the second sheet of electrolyte layer,
      wherein the first and second sheets of anode layer each comprise a Li-metal or metal alloy layer and a two-dimensional (2D) material layer coated on the Li-metal or metal alloy layer, and
      wherein the first and second sheets of cathode layer each comprises sulfur (S) and carbon material;
   (c) a pressing step of: applying pressure onto the multilayered structure formed in the stacking step (b), to make tight contact between the sheets and increase ionic conductivity of the electrolyte layer between the cathode layer and the anode layer, thereby resulting in a pressed multilayered structure including the first unit battery structure and the second unit battery structure;
   (d) a cutting step of: cutting the pressed multilayered structure in the pressing step (c) into a plurality of multilayered battery cells; and
   (e) a termination plating step of: providing positive and negative terminal connections to the multilayered battery cells via metallization to obtain the Li—S battery having the multilayered structure.

2. The method of manufacturing a Li—S battery having a multilayer structure according to claim 1, further comprising:
   a step of sintering prior to the termination plating step (e), but after the cutting step (d): baking the plurality of multilayered battery cells at a predetermined temperature to increase crystalline structures of the electrolytes and burn binders used in the construction of the multilayered battery cells.

3. The method of manufacturing a Li—S battery having a multilayer structure according to claim 1, further comprising:
   a step of testing and inspecting for basic operation of the Li—S battery having the multilayer structure.

4. The method of manufacturing a Li—S battery having a multilayer structure according to claim 1, wherein at least one sheet of: anode layer, cathode layer or electrolyte layer comprises a corrugated surface with a predetermined pattern for making tight contact during the stacking step (b).

5. The method of manufacturing a Li—S battery having a multilayer structure according to claim 1, wherein the pressure applied in the stacking step (b) is greater than 300 MPa.

6. The method of manufacturing a Li—S battery having a multilayer structure according to claim 1, wherein the 2D material of anode layer comprises $MoS_2$, $MoTe_2$, $MoSe_2$, $WS_2$, $WSe_2$, $TiS_2$, $TaSe_2$, $NbSe_2$, $NiTe_2$, BN, BN—C, or alloys thereof.

7. The method of manufacturing a Li—S battery having a multilayer structure according to claim 1, wherein the carbon material of cathode layer comprises carbon nanofibers, carbon nanotubes (CNTs), carbon powder or a combination thereof.

8. The method of manufacturing a Li—S battery having a multilayer structure according to claim 1, wherein the electrolyte layer comprises a polymer electrolyte layer including conductive nanowires.

9. The method of manufacturing a Li—S battery having a multilayered structure according to claim 1, wherein the cathode layer comprises a solid or polymer electrolyte including the carbon material and $Li_2SX$ particles, wherein X=P, Si, Ge, AL, or B.

* * * * *